United States Patent [19]

Jahn

[11] 4,413,654

[45] Nov. 8, 1983

[54] CLEAN OUT DEVICE

[75] Inventor: Guenter Jahn, Winnipeg, Canada

[73] Assignee: Orifice Industries Ltd., Winnipeg, Canada

[21] Appl. No.: 341,907

[22] Filed: Jan. 22, 1982

[30] Foreign Application Priority Data

Jan. 22, 1981 [GB] United Kingdom ............... 8101992

[51] Int. Cl.³ .......................................... F16L 55/10
[52] U.S. Cl. ........................................ 138/92; 138/89; 220/325
[58] Field of Search ................... 138/92, 89; 220/318, 220/325, 213

[56] References Cited

U.S. PATENT DOCUMENTS

| 390,595 | 10/1888 | Heiser | 138/92 |
| 475,135 | 5/1892 | Molt | 220/325 |
| 2,209,580 | 7/1940 | Sargent | 138/92 |
| 2,457,927 | 1/1949 | Scudder | 220/325 |
| 3,724,505 | 4/1973 | Jahn | 138/92 |
| 4,239,055 | 12/1980 | Van Coffman | 138/89 |
| 4,339,054 | 7/1983 | Kellogg | 138/92 |

*Primary Examiner*—John W. Shepperd
*Attorney, Agent, or Firm*—Stanley G. Ade

[57] ABSTRACT

A clean out device includes a frame which is welded into a pipe conduit clean out elbow or the like and has a cover and clamping assembly which pulls the cover up into sealing engagement with the frame. When the clamping assembly is actuated in the opposite rotational direction, it forces the cover away from the frame thus breaking the cover loose from any corrosion or the like which may have occurred around the junction between the cover and the frame. It also forces the cover open against any material which may have become caked or jammed around the seal.

38 Claims, 6 Drawing Figures

CLEAN OUT DEVICE

BACKGROUND OF THE INVENTION

This invention relates to new and useful improvements in clean out devices for conduits and is an improvement over the structure shown in Canadian Pat. No. 862555 and U.S. Pat. No. 3,724,505.

These patents illustrate and describe a clean out device consisting of a substantially oval frame which is welded into position around an aperture cut within a pipe or conduit and has a detachable cover plate engaging a valve seat on the underside of the frame and is clamped into position upwardly against the frame so that pressure within the pipeline or conduit, accentuates rather than reduces, the sealing relationship between the cover and the frame.

There are disadvantages inherent in the original or conventional clean out device such as the difficulty or sometimes impossibility to remove the cover downwardly from the frame particularly when a plug-up occurred directly under the cover or if the cover becomes corroded or rusted to the periphery of the frame as often happens, particularly after extended use.

SUMMARY OF THE INVENTION

The present invention overcomes these disadvantages by providing a device in which the cover can be forced downwardly and away from the frame by the clamping mechanism which is used to seal the cover against the frame.

In accordance with the invention there is provided a clean out device for use within the walls of pipes, conduits, clean out elbows, tanks, chutes and the like comprising in combination a centrally apertured frame, the peripheral wall of the frame defining the central aperture therein, a detachable cover plate selectively and sealably engageable around the underside part of the wall defining the aperture, for selectively closing said aperture, and a clamping assembly secured to said cover and extending substantially perpendicular from the outer surface thereof, and means on the upper side of said frame cooperating with said clamping assembly to hold said cover in the closed, sealed relationship with said frame, said clamping assembly also including means cooperating with said frame, to move said cover out of sealing engagement with said frame.

In accordance with a further embodiment of the invention there is provided a clamping assembly for use with a clean out device securable within the wall of pipes, conduits, clean out elbows and the like, said clean out device including a centrally apertured frame, the peripheral wall of the frame defining the central aperture therein, and a detachable cover plate selectively and sealably engaged around the underside portion of the wall defining the aperture, for selectively closing same; said clamping assembly being securable to said cover and extending perpendicularly from the outer surface thereof, and means provided on the upper side of said frame cooperating with said clamping assembly to hold said cover in the closed, sealed relationship with said frame, said clamping assembly also including means cooperating with the frame to move said cover out of sealing engagement with said frame.

A further advantage of the invention is to provide a device which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
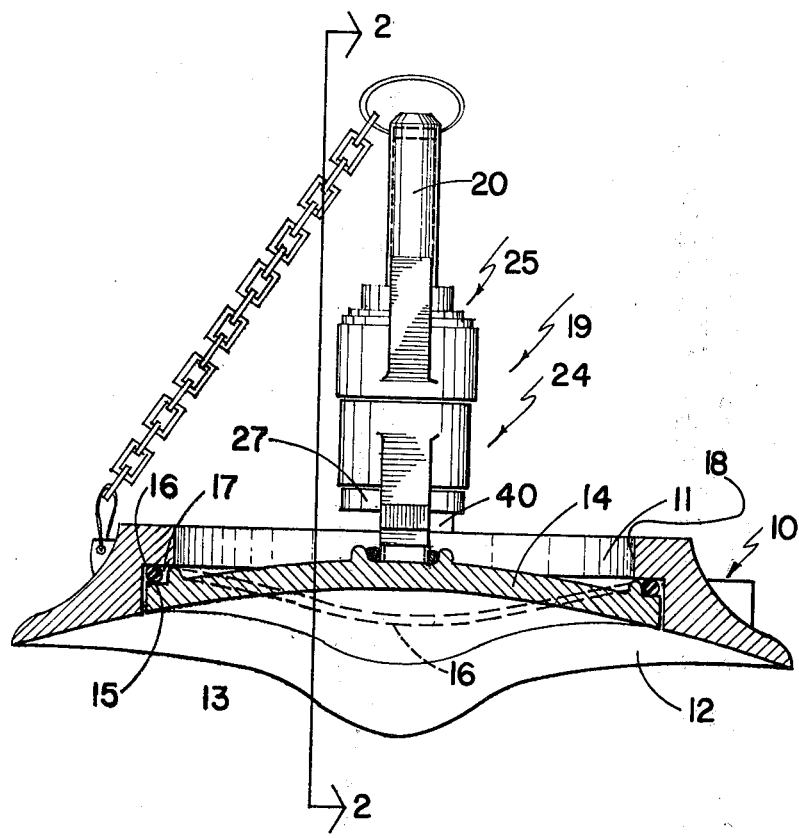
FIG. 1 is a longitudinal cross sectional view of the new clean out device.

Proceeding therefore to describe the invention in detail, reference character 10 illustrates a substantially oval frame having a central aperture 11 and having a base peripheral configuration 12 so that it may be engaged over an oval aperture cut within the wall of a pipeline or conduit (not illustrated) and may be welded thereto or otherwise secured, along the lower peripheral edge area 13, all of which is similar to that shown in the above mentioned patents which are incorporated by reference.

A substantially oval cover panel or clamping plate 14 is provided having a sealing shoulder 15 formed around the periphery thereof to receive a resilient seal 16 which in turn engages an angulated shoulder or seat 17 formed on the underside of the wall 18 defining the oval opening or aperture 11 within the frame 10 so that the cover 14 sealably engages the underside of the wall 18 within the shoulder 17 when in the clamping or sealed position shown in the drawings.

Figure 2:
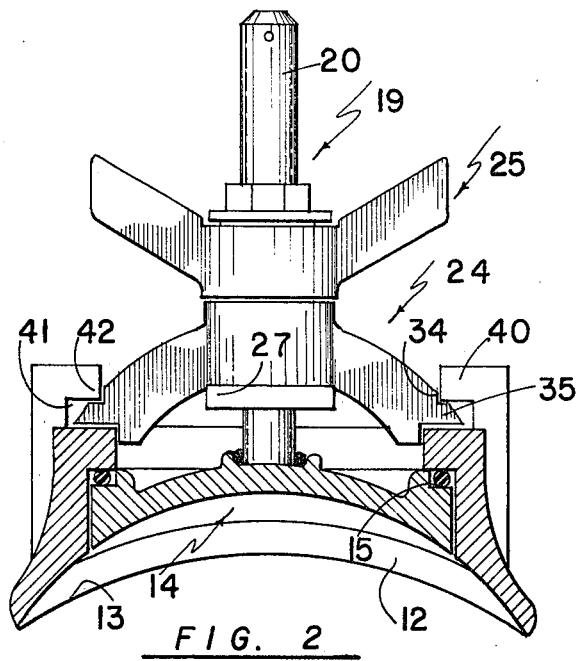
FIG. 2 is a transverse cross sectional substantially along the line 2—2 of FIG. 1.

It will be noted that in FIGS. 1 and 2 the underside of the cover 14 is arcuately curved in both planes to suit the curvature of the underside of the frame 10 which in turn is substantially similar to the curvature of the wall of the pipe or conduit to which the device is welded.

Figure 3:
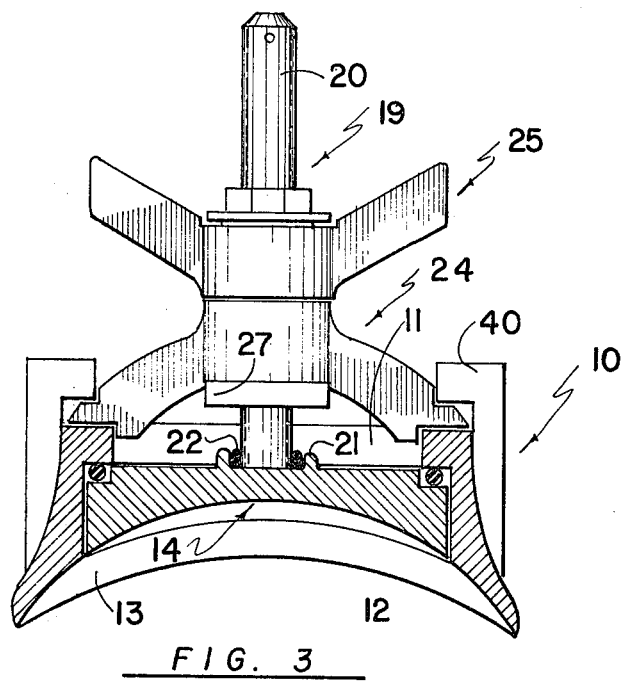
FIG. 3 is a view similar to FIG. 2, but showing an alternative construction.

FIG. 3 shows an alternative configuration of the cover 14 in which the upper surface of the cover is substantially planar whereas in FIGS. 1 and 2, the upper surface is similar in curvature to the lower surface. FIG. 3 shows a slightly stronger construction than that illustrated in FIGS. 1 and 2.

A clamping assembly is provided collectively designated 19 operatively engageable over a threaded stem or spindle 20 extending upwardly from the centre of the upper surface of the cover 14 and being seated within an annular shoulder 21 and secured as by welding 22.

Figure 4:
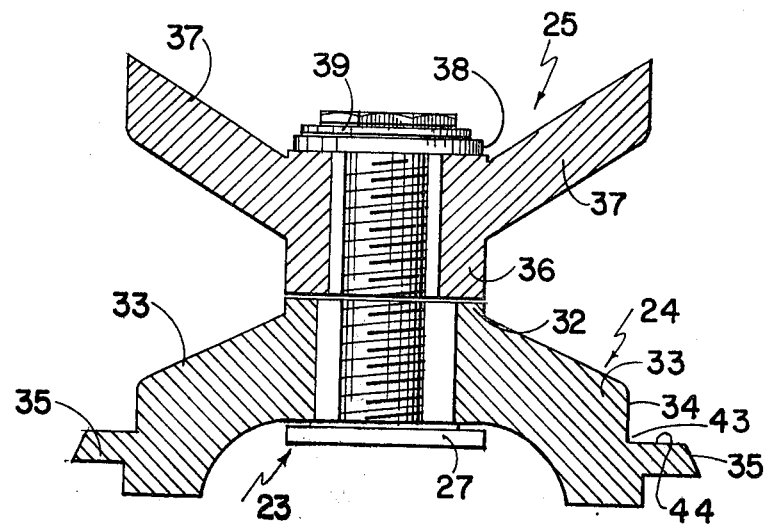
FIG. 4 is a partial cross section of the clamping assembly per se.
Figure 5:
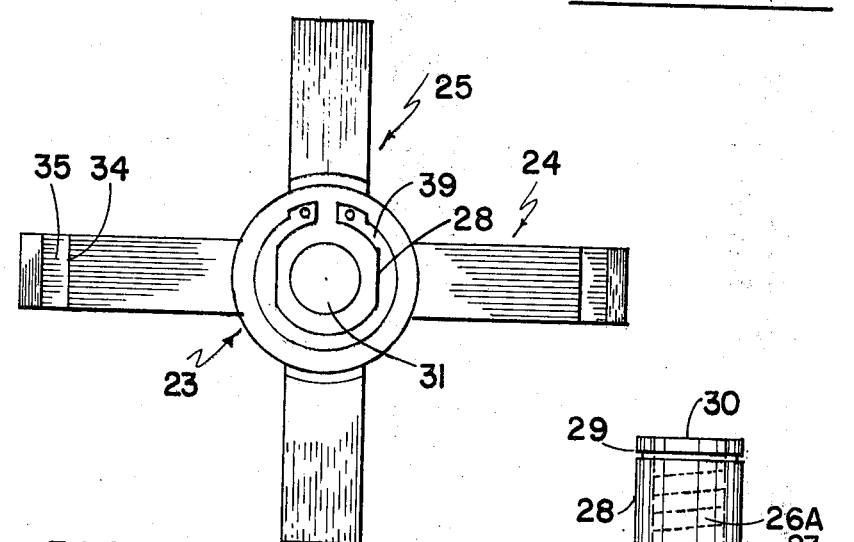
FIG. 5 is a top plan view of FIG. 4.
Figure 6:
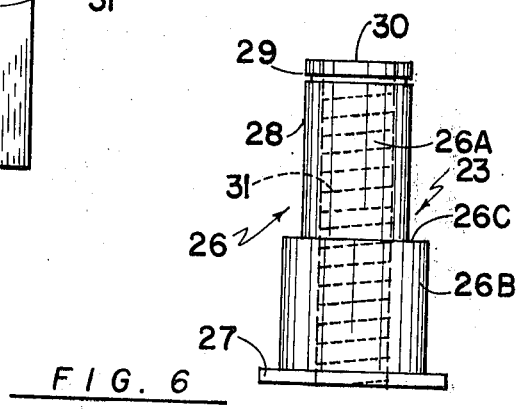
FIG. 6 is a front elevation of the central stem of the clamping assembly per se.

The clamping assembly 19 is shown in detail in FIGS. 4, 5 and 6 and includes a cylindrical central portion collectively designated 23, a clamping member collectively designated 24 and an actuating member collectively designated 25.

The central cylindrical member or element 23 includes a cylindrical portion 26 with an annular shouldered or flanged lower end 27 formed thereon. A pair of flats 28 are formed on the upper part 26A of the portion 26 and an annular groove 29 is formed around the upper or flatted portion 28 adjacent to the upper end 30 thereof. The diameter of the lower portion or part 26B is larger than the diameter of the upper portion or part 26A thereby defining a shoulder 26C therebetween.

A central screw threaded bore 31 is formed through the cylindrical member 23 and screw threadably engages the stem 20.

The clamping portion or member 24 includes a cylindrical centre portion 32 apertured to slidably engage over the lower portion 26 of the cylindrical part 23 and to be freely rotatable upon this lower portion being restricted in downward movement by the flanged shouldered portion 27. A pair of legs 33 extend outwardly from the outer wall of the cylindrical portion 32 and include a vertical end wall 34 at the extremity thereof, from which a horizontally extending finger 35 extends, the purpose of which will hereinafter be described.

The actuating member 25 includes a central cylindrical portion 36, the inner configuration of which is similar to the cross sectional configuration of the upper or flatted portion of the member 23 so that when engaged over this upper portion and resting upon the shoulder 26C adjacent to the upper end of the portion 32 of the clamping member 24, rotates the entire cylindrical portion 23 when the actuating member is rotated. To facilitate this rotation, a pair of wings 37 extend outwardly one upon each side of the cylindrical portion 36. A washer 38 engages over the upper end of the flatted portion 28 and is retained in position by means of a retainer such as a spring circlip 39 engaging within the aforementioned annular groove 29 or by other conventional fastening means.

In operation, the screw threaded central portion 23 screw threadably engages the screw threaded stem 20 extending upwardly from the cover 14, and the clamping member 24 engages over this portion 23 and is freely rotatable thereon, resting against the flanged or annular portion 27 on the lower end thereof. The actuating member 25 is engaged over the flatted portion 28 of the cylindrical central portion 23 and is retained in position by means of the spring clip 39 so that when this actuating portion is rotated by means of the wings 37, the cylindrical central portion 23 is also rotated upon the screw threaded stem 20 and moves upwardly or downwardly thereon depending upon the direction of rotation, carrying with it the clamping portion 24 which is movable endwise with the cylindrical central portion 23 but is independently and freely rotatable thereon.

A pair of finger engaging claws or members 40 extend upwardly from the frame 10 one upon each side thereof and are provided with recesses 41 on the inner sides thereof to receive the fingers 35 of the clamping member 24. These recesses are closed at one end to assist in the engagement and location of the fingers 35 when the clamping member 24 is moved into engagement therewith.

When the clamping member 24 is turned upon the lower stepped portion 26 of the cylindrical centre portion 23 so that the fingers 35 are disengaged from the recesses 41, the cover 14 can be moved downwardly to clear the seat 17 whereupon the cover assembly together with the clamping assembly 19, may be manipulated clear of the frame 10 and can be withdrawn thus permitting access to the interior of the pipe or conduit for inspection purposes, for clean out purposes, or for coating the inside of pipes as may be desired.

When it is desired to close the opening, the cover is manipulated through the oval aperture 11 within the frame by grasping same by the clamping assembly 19 whereupon the cover is then pulled upwardly into the seating position illustrated in FIGS. 1 and 2 and the clamping member 24 is partially rotated to engage the fingers 35 within the recesses 41 as clearly shown in FIG. 2. This also allows the fingers to act as horizontal guides for alignment of the cover with the frame. The actuating member 25 is then rotated to move the cylindrical central portion 23 upwardly relative thereto thus pulling the cover into sealing relationship against the resilient seal 16 and clamping the cover firmly in the position illustrated, it being understood that the cylindrical central portion 23 cannot move upwardly because of the engagement of the clamping member 24 with the claws 40 of the frame.

If a plug-up occurs directly under the cover or if the cover is corroded into the closed position or, as in the case of crude oil and petrol chemical products, a wax build-up has formed on the interior of the conduit, thus preventing movement of the cover, the following action takes place when it is desired to remove the cover.

The actuating member 25 is rotated in the opposite direction thus causing the stem 20 to move downwardly. This downward movement is due to the fact that the clamping member 24 remains in engagement with the claws or members 40 with the portions or ends 42 of the claws registering within the cut-outs 43 on the legs 33 defined by the vertical walls 34 and the top surfaces 44 of the fingers 35. This causes downward pressure to be applied to the cover 14 thus breaking it away from the frame 10 so that it can be removed in the manner hereinbefore described.

Summarizing, with the conventional type of clean out device, when a plug-up occurs directly under the cover it is difficult or impossible to remove the cover from the frame. For example, such a plug-up often occurs in the paper industry, but by using the clean out device hereinbefore described, it is now possible to force the cover downwardly thus creating an opening between the cover and the frame. It is then possible to flush out with water, some of the product forming the plug-up, leaving a cavity to allow for the removal of the remainder of the product causing the blockage.

In the production of crude oil and petrol chemical products, wax build-ups are often formed on the inside of conveying pipes or conduits and the present device allows the cover to be forced downwardly, thus breaking the wax build-up and allowing removal of the cover from the frame. It should be stressed that visual inspection for corrosion and cleanliness of the piping system is an important factor in many industries.

The present device is preferably manufactured to ANSI specification and codes and the extension of the frame walls permits the taking of x-rays which are required in many oil pipeline services. Furthermore, on installations in straight lengths of piping conduits, the opening permits access to the interior thereof for coating the insides of the pipelines or conduits. The check chains between the spindle 20 and the frame 10 eliminates any possibility of the cover 14 becoming displaced and lost within the pipe, conduit or the like.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A clean out device for use within the wall of pipes, conduits, clean out elbows, tanks, chutes and the like comprising in combination a centrally apertured frame, the peripheral wall of the frame defining the central aperture therein, a detachable cover plate selectively and sealably engageable around the underside part of the wall defining the aperture, for selectively closing said aperture, and a clamping assembly secured to said cover and extending substantially perpendicular from the outer surface thereof, and means on the upper side of said frame cooperating with said clamping assembly to hold said cover in the closed, sealed relationship with said frame, said clamping assembly also including means cooperating with said frame, to move said cover out of sealing engagement with said frame, said clamping assembly including a screw threaded stem secured to and extending upwardly from said cover plate, a cylindrical element screw threadably engaging upon said stem, a clamping member freely engaging the lower part of said cylindrical element and cooperating with said frame, means retaining said clamping member upon said cylindrical element, an actuating member engaging said cylindrical element above said clamping member, said actuating member being operatively secured to said cylindrical element to rotate said cylindrical element upon said stem, and means retaining said actuating member upon said cylindrical element.

2. The device according to claim 1 in which said cylindrical element includes a lower part upon which said clamping member engages and an upper part upon which said actuating member engages, the diameter of said upper part being less than the diameter of said lower part thereby defining an annular shoulder therebetween.

3. The device according to claim 2 in which said means to retain said clamping member upon said cylindrical element includes an annular flange formed on the lower end of said cylindrical element.

4. The device according to claim 3 in which said means to retain said actuating member upon said cylindrical element includes an annular groove adjacent the upper end of said element and a spring clip detachably seated within said groove and extending outwardly beyond said groove, the sides of said upper part of said cylindrical element being flattened, the bore of said actuating member having a similar cross section to the cross section of the outer wall of said upper part of said cylindrical element thereby operatively securing said actuating member to said cylindrical element to rotate said cylindrical element upon said stem.

5. The device according to claim 4 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

6. The device according to claim 3 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

7. The device according to claim 2 in which said means to retain said actuating member upon said cylindrical element includes an annular groove adjacent the upper end of said element and a spring clip detachably seated within said groove and extending outwardly beyond said groove, the sides of said upper part of said cylindrical element being flattened, the bore of said actuating member having a similar cross section to the cross section of the outer wall of said upper part of said cylindrical element thereby operatively securing said actuating member to said cylindrical element to rotate said cylindrical element upon said stem.

8. The device according to claim 7 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

9. The device according to claim 2 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

10. The device according to claim 1 in which said means to retain said clamping member upon said cylindrical element includes an annular flange formed on the lower end of said cylindrical element.

11. The device according to claim 10 in which said means to retain said actuating member upon said cylindrical element includes an annular groove adjacent the upper end of said element and a spring clip detachably seated within said groove and extending outwardly beyond said groove, the sides of said upper part of said cylindrical element being flattened, the bore of said actuating member having a similar cross section to the cross section of the outer wall of said upper part of said cylindrical element thereby operatively securing said actuating member to said cylindrical element to rotate said cylindrical element upon said stem.

12. The device according to claim 11 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

13. The device according to claim 10 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

14. The device according to claim 1 in which said means to retain said actuating member upon said cylindrical element includes an annular groove adjacent the upper end of said element and a spring clip detachably seated within said groove and extending outwardly beyond said groove, the sides of said upper part of said cylindrical element being flattened, the bore of said actuating member having a similar cross section to the cross section of the outer wall of said upper part of said cylindrical element thereby operatively securing said actuating member to said cylindrical element to rotate said cylindrical element upon said stem.

15. The device according to claim 14 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

16. The device according to claim 1 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

17. The device according to claims 9, 13 or 16 in which said finger engaging means each define a horizontal recess with the upper side of said frame, one said recess being opened at one end to receive the corresponding finger and being closed at the opposite end to locate and restrict the movement of the corresponding finger therein, the other said recess being opened at the opposite end to receive the corresponding finger and closed at said one end to locate and restrict the movement of said corresponding finger, the engagement of said fingers within said recesses preventing upward and downward movement of said clamping member, said actuating member and said cylindrical element whereby rotation of said actuating member upon said stem in one direction, moves said stem and hence said cover panel into sealing engagement with the underside portion of the wall of said frame defining the aperture therein, and rotation of said actuating member in the opposite direction, moves said stem and hence said cover panel away from sealing engagement with the portion of the wall of said frame defining the aperture therein.

18. The device according to claims 6, 8 or 15 in which said finger engaging means each define a horizontal recess with the upper side of said frame, one said recess being opened at one end to receive the corresponding finger and being closed at the opposite end to locate and restrict the movement of the corresponding finger therein, the other said recess being opened at the opposite end to receive the corresponding finger and closed at said one end to locate and restrict the movement of said corresponding finger, the engagement of said fingers within said recesses preventing upward and downward movement of said clamping member, said actuating member and said cylindrical element whereby rotation of said actuating member upon said stem in one direction, moves said stem and hence said cover panel into sealing engagement with the underside portion of the wall of said frame defining the aperture therein, and rotation of said actuating member in the opposite direction, moves said stem and hence said cover panel away from sealing engagement with the portion of the wall of said frame defining the aperture therein.

19. The device according to claims 5 or 12 in which said finger engaging means each define a horizontal recess with the upper side of said frame, one said recess being opened at one end to receive the corresponding finger and being closed at the opposite end to locate and restrict the movement of the corresponding finger therein, the other said recess being opened at the opposite end to receive the corresponding finger and closed at said one end to locate and restrict the movement of said corresponding finger, the engagement of said fingers within said recesses preventing upward and downward movement of said clamping member, said actuating member and said cylindrical element whereby rotation of said actuating member upon said stem in one direction, moves said stem and hence said cover panel into sealing engagement with the underside portion of the wall of said frame defining the aperture therein, and rotation of said actuating member in the opposite direction, moves said stem and hence said cover panel away from sealing engagement with the portion of the wall of said frame defining the aperture therein.

20. A clamping assembly for use with a clean out device securable within the walls of pipes, conduits, clean out elbows and the like, said clean out device including a centrally apertured frame, the peripheral wall of the frame defining the central aperture therein, and a detachable cover plate selectively and sealably engaged around the underside portion of the wall defining the aperture, for selectively closing same; said clamping assembly being securable to said cover and extending perpendicularly from the outer surface thereof, and means provided on the upper side of said frame cooperating with said clamping assembly to hold said cover in the closed, sealed relationship with said frame, said clamping assembly also including means cooperating with the frame to move said cover out of sealing engagement with said frame, said clamping assembly including a screw threaded stem secured to and extending upwardly from said cover plate, a cylindrical element screw threadably engaging upon said stem, a clamping member freely engaging the lower part of said cylindrical element and cooperating with said frame, means retaining said clamping member upon said cylindrical element, an actuating member engaging said cylindrical element above said clamping member, said actuating member being operatively secured to said cylindrical element to rotate said cylindrical element upon said stem, and means retaining said actuating member upon said cylindrical element.

21. The device according to claim 20 in which said cylindrical element includes a lower part upon which said clamping member engages and an upper part upon which said actuating member engages, the diameter of said upper part being less than the diameter of said lower part thereby defining an annular shoulder therebetween.

22. The device according to claim 21 in which said means to retain said clamping member upon said cylindrical element includes an annular flange formed on the lower end of said cylindrical element.

23. The device according to claim 22 in which said means to retain said actuating member upon said cylindrical element includes an annular groove adjacent the upper end of said element and a spring clip detachably seated within said groove and extending outwardly beyond said groove, the sides of said upper part of said cylindrical element being flattened, the bore of said actuating member having a similar cross section to the cross section of the outer wall of said upper part of said cylindrical element thereby operatively securing said actuating member to said cylindrical element to rotate said cylindrical element upon said stem.

24. The device according to claim 23 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

25. The device according to claim 22 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

26. The device according to claim 21 in which said means to retain said actuating member upon said cylindrical element includes an annular groove adjacent the upper end of said element and a spring clip detachably seated within said groove and extending outwardly beyond said groove, the sides of said upper part of said cylindrical element being flattened, the bore of said actuating member having a similar cross section to the cross section of the outer wall of said upper part of said cylindrical element thereby operatively securing said actuating member to said cylindrical element to rotate said cylindrical element upon said stem.

27. The device according to claim 26 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

28. The device according to claim 21 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

29. The device according to claim 21 in which said means to retain said clamping member upon said cylindrical element includes an annular flange formed on the lower end of said cylindrical element.

30. The device according to claim 29 in which said means to retain said actuating member upon said cylindrical element includes an annular groove adjacent the upper end of said element and a spring clip detachably seated within said groove and extending outwardly beyond said groove, the sides of said upper part of said cylindrical element being flattened, the bore of said actuating member having a similar cross section to the cross section of the outer wall of said upper part of said cylindrical element thereby operatively securing said actuating member to said cylindrical element to rotate said cylindrical element upon said stem.

31. The device according to claim 30 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

32. The device according to claim 29 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

33. The device according to claim 20 in which said means to retain said actuating member upon said cylindrical element includes an annular groove adjacent the upper end of said element and a spring clip detachably seated within said groove and extending outwardly beyond said groove, the sides of said upper part of said cylindrical element being flattened, the bore of said actuating member having a similar cross section to the cross section of the outer wall of said upper part of said cylindrical element thereby operatively securing said actuating member to said cylindrical element to rotate said cylindrical element upon said stem.

34. The device according to claim 33 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

35. The device according to claim 20 in which said clamping member includes an apertured central portion and at least two legs extending diametrically outwardly therefrom, and a finger extending from the distal end of each leg, said frame including a finger engaging means on the upper side thereof, said fingers selectively engaging under said finger engaging means, said actuating member including a central portion and at least two wings extending diametrically outwardly therefrom.

36. The device according to claims 25 28 or 35 in which said finger engaging means each define a horizontal recess with the upper side of said frame, one said recess being opened at one end to receive the corresponding finger and being closed at the opposite end to locate and restrict the movement of the corresponding finger therein, the other said recess being opened at the opposite end to receive the corresponding finger and closed at said one end to locate and restrict the movement of said corresponding finger, the engagement of said fingers within said recesses preventing upward and downward movement of said clamping member, said actuating member and said cylindrical element whereby rotation of said actuating member upon said stem in one direction, moves said stem and hence said cover panel into sealing engagement with the underside portion of the wall of said frame defining the aperture therein, and rotation of said actuating member in the opposite direction, moves said stem and hence said cover panel away from sealing engagement with the portion of the wall of said frame defining the aperture therein.

37. The device according to claims 25, 27 or 34 in which said finger engaging means each define a horizontal recess with the upper side of said frame, one of said recess being opened at one end to receive the corresponding finger and being closed at the opposite end to locate and restrict the movement of the corresponding finger therein, the other said recess being opened at the opposite end to receive the corresponding finger and closed at said one end to locate and restrict the movement of said corresponding finger, the engagement of said fingers within said recesses preventing upward and downward movement of said clamping member, said actuating member and said cylindrical element whereby rotation of said actuating member upon said stem in one direction, moves said stem and hence said cover panel into sealing engagement with the underside portion of the wall of said frame defining the aperture therein, and rotation of said actuating member in the opposite direction, moves said stem and hence said cover panel away from sealing engagement with the portion of the wall of said frame defining the aperture therein.

38. The device according to claims 24 or 37 in which said finger engaging means each define a horizontal recess with the upper side of said frame, one of said recess being opened at one end to receive the corresponding finger and being closed at the opposite end to locate and restrict the movement of the corresponding finger therein, the other said recess being opened at the opposite end to receive the corresponding finger and closed at said one end to locate and restrict the movement of said corresponding finger, the engagement of said fingers within said recesses preventing upward and downwardly movement of said clamping member, said actuating member and said cylindrical element whereby rotation of said actuating member upon said stem in one direction, moves said stem and hence said cover panel into sealing engagement with the underside portion of the wall of said frame defining the aperture therein, and rotation of said actuating member in the opposite direction, moves said stem and hence said cover panel away from sealing engagement with the portion of the wall of said frame defining the aperture therein.

* * * * *